US006260673B1

(12) United States Patent
Mustalahti

(10) Patent No.: US 6,260,673 B1
(45) Date of Patent: Jul. 17, 2001

(54) HOLDING BRAKE FOR A TRACTION SHEAVE ELEVATOR

(75) Inventor: Jorma Mustalahti, Hyvinkää (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 09/327,625

(22) Filed: Jun. 8, 1999

(30) Foreign Application Priority Data

Jun. 8, 1999 (FI) ........................................ 981305

(51) Int. Cl.[7] ........................................ B60T 1/00

(52) U.S. Cl. ........................ 188/186; 188/29; 187/288; 187/358

(58) Field of Search ........................ 188/186, 76, 29, 188/17; 187/350, 351, 356, 357, 358, 288, 254

(56) References Cited

U.S. PATENT DOCUMENTS 2,702,101 * 2/1955 Dewhurst ........................ 188/76
3,795,290 * 3/1974 Hori et al. ........................ 188/76
4,049,089 9/1977 Rundle .
4,805,741 * 2/1989 de Jong et al. ........................ 137/350
5,007,505 * 4/1991 Lindegger ........................ 188/186
5,153,389 * 10/1992 Nomura ........................ 187/351
5,373,919 * 12/1994 Siegrist ........................ 188/76

FOREIGN PATENT DOCUMENTS 2343918 3/1975 (DE) .

* cited by examiner

*Primary Examiner*—Robert J. Oberleitner
*Assistant Examiner*—Robert A. Siconolfi
(74) *Attorney, Agent, or Firm*—Birch, Stewart, Kolasch & Birch, LLP

(57) ABSTRACT

Brake shoe for a traction sheave elevator, comprising a brake body (1), a brake shoe (2) attached to the brake body, a retractor (4) in the brake body for keeping the brake shoe clear of a brake wheel (5), and a mechanical pressure element (6) for pressing the brake shoe against the brake wheel. Moreover, the holding brake comprises an intermediate frame (7) disposed between the brake body (1) and the brake shoe (2), the pressure element being arranged to apply a pressure on the intermediate frame. The holding brake further comprises adjusting elements (8) between the intermediate frame and the brake shoe to allow adjustment of the position of the brake shoe in relation to the intermediate frame when the air gap (3) between the brake shoe and the brake wheel is being adjusted.

13 Claims, 3 Drawing Sheets

HOLDING BRAKE FOR A TRACTION SHEAVE ELEVATOR

FIELD OF THE INVENTION

Figure 1:
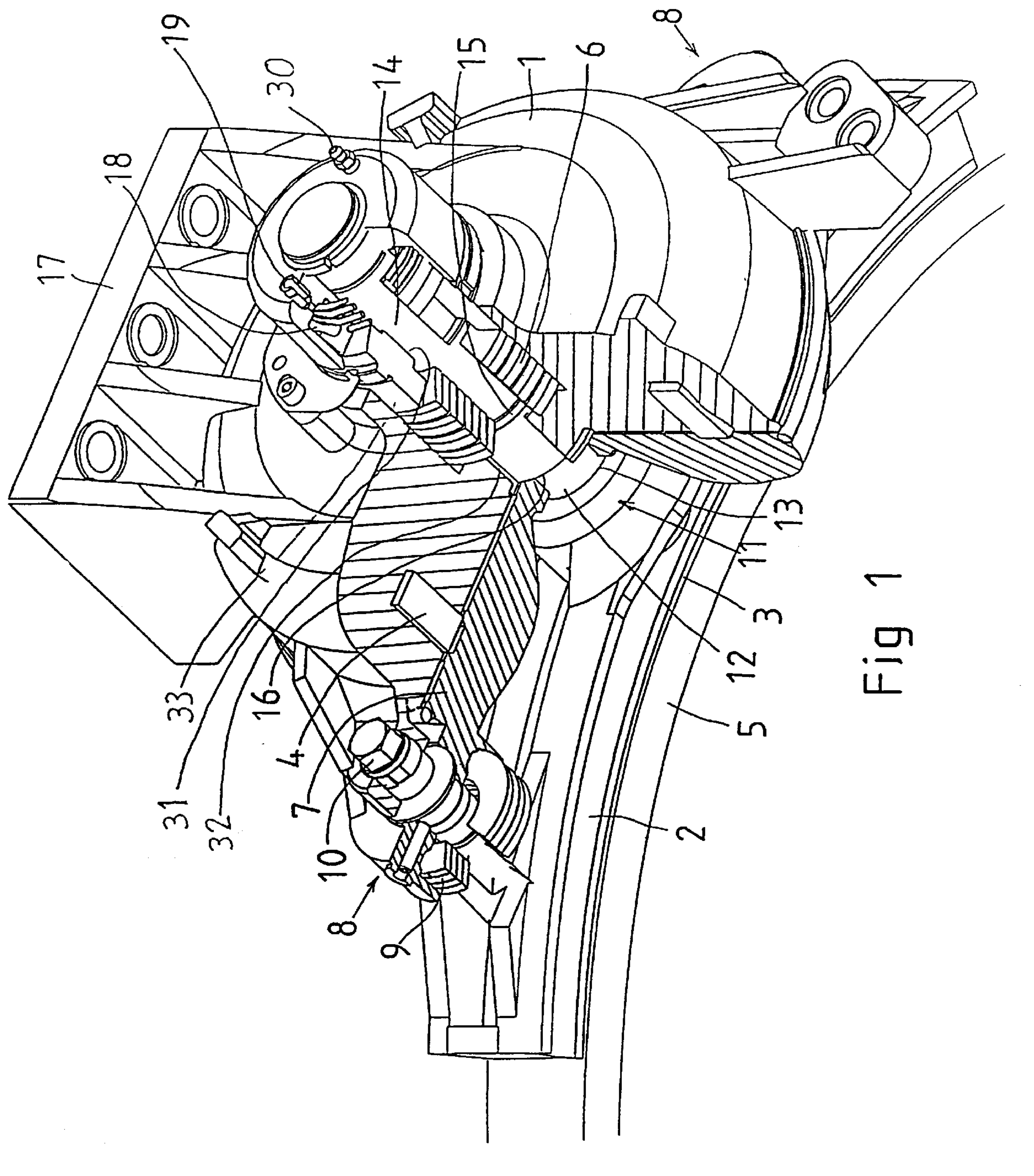

The present invention relates to a holding brake for a traction sheave elevator.

DESCRIPTION OF THE BACKGROUND ART

The function of a holding brake is to hold an elevator stationary at a floor and also to stop the elevator car or prevent its motion during a power failure. Therefore, the braking action of the holding brake is based on a mechanical pressure element, such as a spring, which keeps the brake engaged when there are no external forces acting on it. As the holding brake is activated each time when the car arrives at a floor and releases each time the car leaves a floor, its operation must be as fast, accurate and noiseless as possible so that it will not be noticed by elevator users. For this reason, the air gap between the brake shoe of the holding brake and the traction sheave or a possible separate brake wheel must be as narrow as possible to allow the braking to occur as quickly as possible and to keep the impact energy of the brake shoe as low as possible and the locking of the brake as noiseless as possible. On the other hand, it is to be noted that there must be a definite air gap between the brake shoe and the braking surface and that the brake shoe must not chafe the braking surface as this would result in undesirable noise during elevator travel.

In holding brakes used at present in traction sheave elevators, i.e. in normal slide brakes, bearing tolerances in the brake lever systems and structural deflections impair the accuracy of the braking action, which is why it is necessary to use relatively large air gaps in holding brakes. Therefore, the required movements in the brake shoe and in the parts actuating it are large, implementing the movements requires relatively large and expensive components, and the braking action produces a relatively noisy impact due to the large air gap. Especially the electromagnet used to release the brake is relatively large and expensive due to the long brake shoe travel upon release of the brake.

SUMMARY OF THE INVENTION

The object of the present invention is to eliminate the drawbacks described above. A specific object of the invention is to disclose a new type of holding brake for a traction sheave elevator, a brake which is accurate in operation as well as fast and noiseless, which is easy to adjust and which can be implemented using smaller, lighter and less expensive components.

The brake shoe of the invention for a traction sheave elevator comprises a brake body and a brake shoe attached to the brake body. Moreover, the holding brake comprises a mechanical pressure element, which may be a spring or equivalent, arranged to press the brake shoe against a brake wheel to prevent rotation of the brake wheel. The holding brake also comprises a retractor arranged to apply a pull to the brake shoe to keep it clear of the brake wheel when the brake is not active, i.e. when the car is moving. The element used as a retractor is generally an electromagnet, but other mechanical, electrical, hydraulic or corresponding arrangements may be used as well.

According to the invention, the holding brake comprises an intermediate frame disposed between the brake body and the brake shoe, with a pressure element applying a pressure on the intermediate frame. In addition, the holding brake comprises adjusting elements between the intermediate frame and the brake shoe to allow the position of the brake shoe to be adjusted in relation to the intermediate frame so as to maintain an air gap of exactly the desired width between the brake shoe and the brake wheel. Thus, in the holding brake of the invention, the brake shoe and the intermediate frame are connected together by the adjusting elements so that, due to the action of the electromagnet or mechanical pressure element, they move together as a rigid assembly during the braking action. The intermediate frame and the brake shoe are only moved or adjusted relative to each other when the air gap between the brake shoe and the brake wheel is to be adjusted. Thus, the holding brake of the invention has a fixed and stationary brake body while adjustment of the air gap is accomplished as an internal adjustment between brake components within the brake.

The braking surface of the brake shoe is preferably an elongated part with a curved shape in the direction of motion of the brake wheel so that it has a relatively long contact area with the braking surface of the brake wheel along the rim of the wheel. In this case, the holding brake preferably comprises two adjusting elements between the intermediate frame and the brake shoe, disposed on both sides of the middle portion of the brake shoe, preferably relatively close to its ends.

In the adjusting element between the brake shoe and the intermediate frame, preferably an adjusting spring and a clamping element are used, the clamping element being arranged to pull the brake shoe toward the intermediate frame against the pressure of the adjusting spring. As a result, there is no clearance in the joint between the intermediate frame and the brake shoe and a precise motion between them is achieved.

In another embodiment, the adjusting element is implemented using a pack of adjusting shims and a tightening means so that a pack of suitable total thickness consisting of one or more adjusting shims is formed in the adjusting element, whereupon the intermediate frame and the brake shoe are tightened to each other by means of the adjusting element, thus setting them to a position determined by the pack of adjusting shims relative to each other.

The holding brake preferably comprises suitable guides, rails, pins, holes or equivalent disposed between the brake body and the brake shoe to keep the brake shoe accurately in the correct direction and position relative to the brake wheel, these guide elements only permitting perpendicular compressive motion of the braking surfaces against each other.

As compared with prior art, the holding brake of the invention has significant advantages. Thanks to the structure of the invention, a well-functioning brake with a very narrow air gap is achieved. The brake wheel may consist of the traction sheave, which has a relatively large diameter. As a consequence of the small air gap and advantageous diameter ratio, a smaller brake magnet and smaller brake components can be used, resulting in a lower price. The long and narrow brake shoe and the two adjusting screws at its ends allow accurate control of the brake shoe so as to achieve a precise engagement with the surface of the brake wheel, resulting in effective braking. As the adjusting elements act directly on the brake shoe, the bearing clearances and structural deflections in the brake lever mechanisms have no effect on the operation of the brake, unlike normal sliding brakes. Moreover, the small air gap means a low impact energy of the brake shoe, so the closing action of the brake is quieter than in traditional brakes. In addition, as the long brake shoe needs only two adjusting elements, the brake is very easy to adjust.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 2:
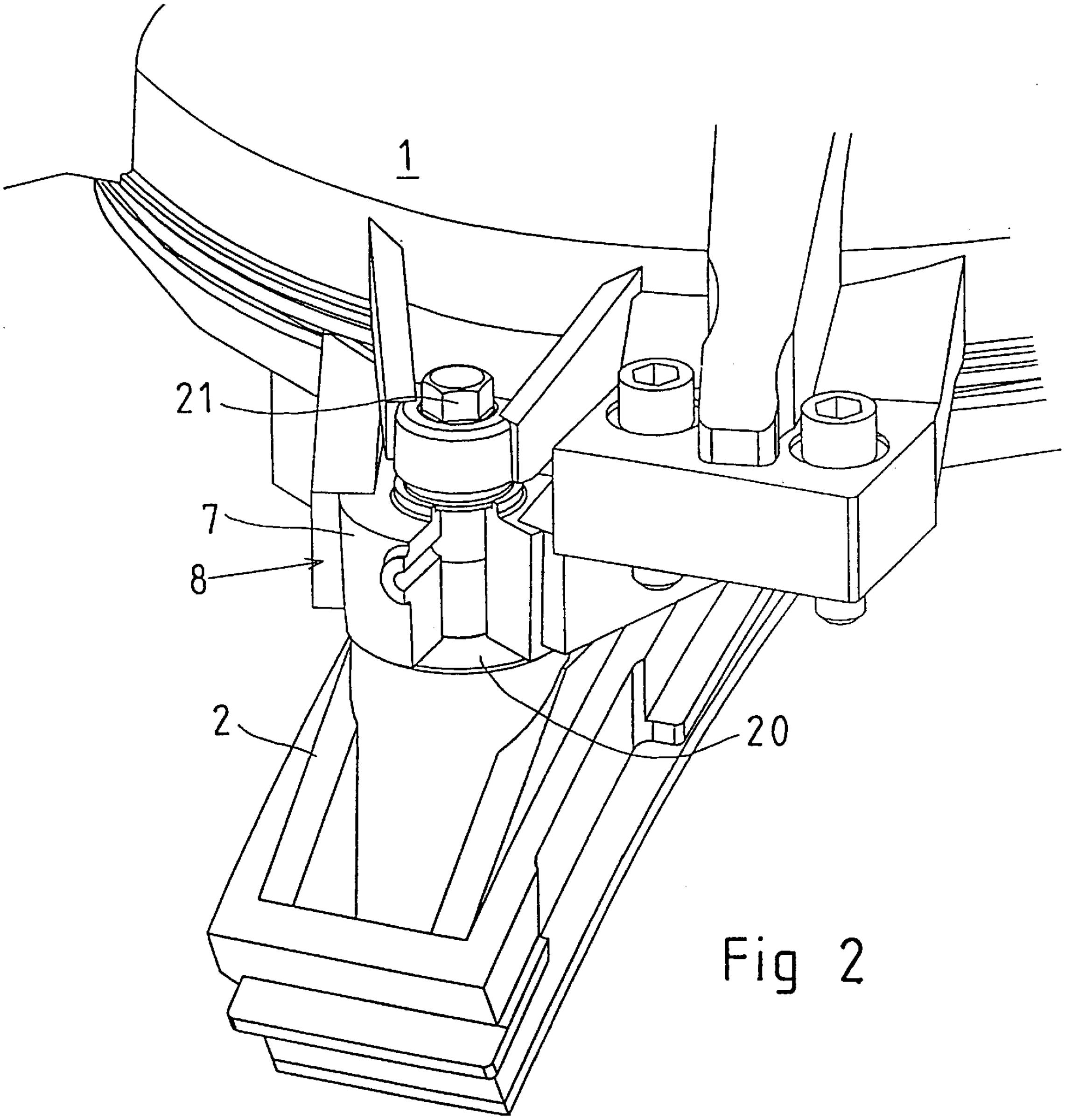
Figure 3:
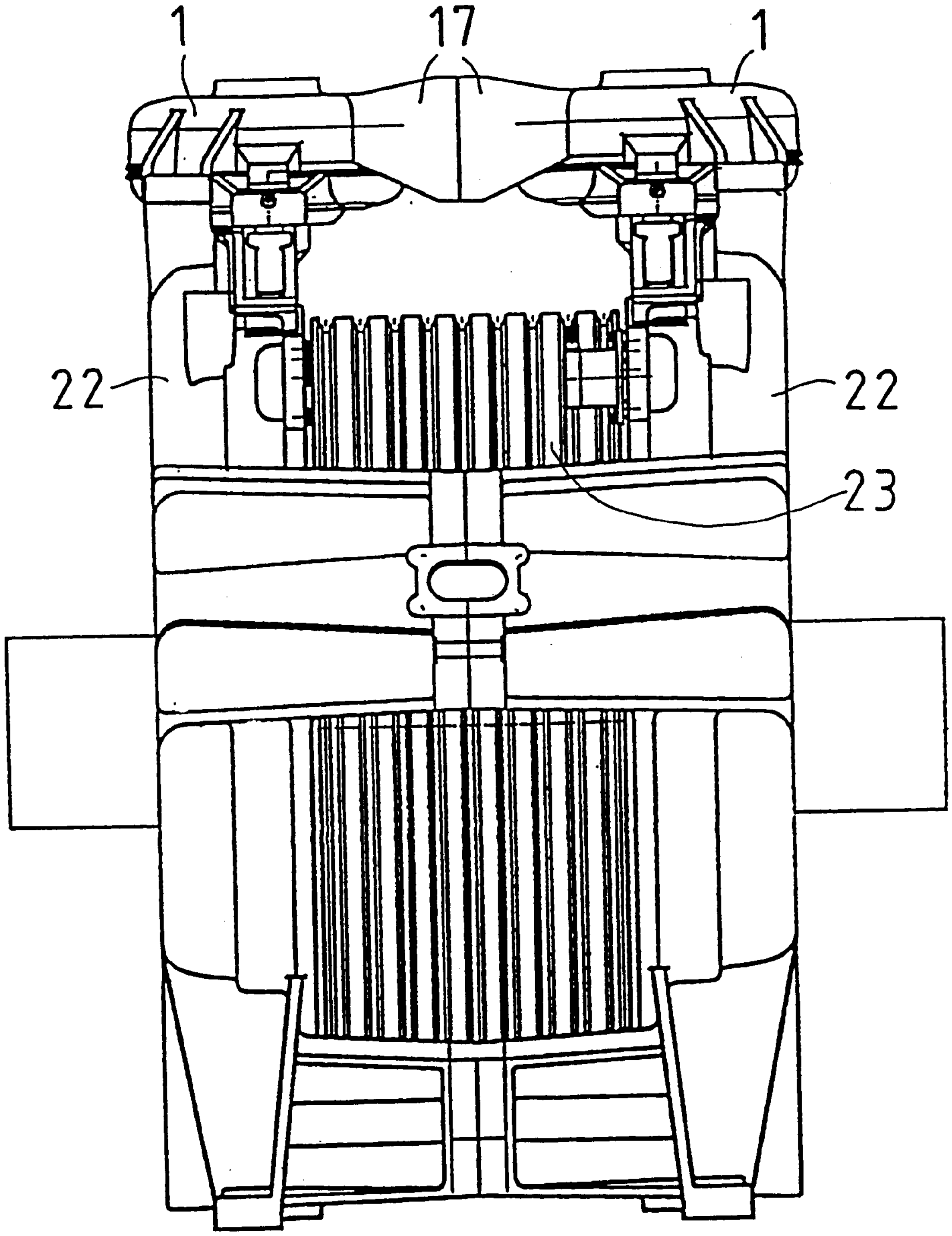

In the following, the invention will be described in detail with reference to the attached way of illustration only, and thus are not limitative of the present invention, and wherein FIG. 1 presents a partially sectioned view of a holding brake for a traction sheave elevator as provided by the invention, FIG. 2 presents a detail of the holding brake in FIG. 1, and FIG. 3 presents a third embodiment of the invention in conjunction with a double machine.

DETAILED DESCRIPTION OF THE PREFERRED EMBODIMENTS

The holding brake for a traction sheave elevator presented in the drawing comprises a brake body 1 with a brake frame 17, i.e. a sturdy bracket by which the holding brake can be attached e.g. to the frame of an elevator motor or to some other suitable fixed part. The brake body comprises a round discoid ring with an annular electromagnet 4 embedded in it. The electromagnet is located on the substantially planar lower surface of the brake body and towards the inside of the brake body. Placed against the planar lower surface of the brake body is a substantially annular intermediate frame 7. Below the intermediate frame is an elongated brake shoe 2 of a curved shape, which is pressed against a brake wheel 5 when the brake is applied. When the brake is not active, there is an air gap 3 between the brake shoe 2 and the brake wheel 5.

The intermediate frame 7 and the brake shoe 2 are connected together by adjusting elements 8 disposed near the ends of the elongated brake shoe. The adjusting element 8 comprises an adjusting spring 9, whose pressure tends to move the brake shoe and intermediate frame away from each other, and a clamping element 10, i.e. a tightening screw, by means of which the brake shoe and the intermediate frame can be drawn toward each other against the spring force of the adjusting spring 9. Thus, the motion between the brake shoe and the intermediate frame is always precise and free of play. The adjusting spring 9 used in the embodiment in FIG. 1 is a discord spring set, which allows a good force density and a compact size to be achieved. However, it is also possible to use e.g. spiral springs or a suitable compressible material.

Located in the center of the discoid brake body 1 is a power transmission shaft 14. Mounted on the brake body 1 around the power transmission shaft is a pressure element 6, i.e. a disk spring set, whose lower edge rests on a shoulder 15 in the shaft. Here, too, instead of a disk spring, it is possible to use other types of springing elements. Thus, via the shoulder 15, the pressure element 6 presses the shaft downward toward the brake shoe 2. Below the shoulder, the shaft 14 has a step 16, which is pressed against the top surface of the intermediate frame 7. Thus, when the shaft 14 is pressed downward, it presses the intermediate frame and together with it the brake shoe against the brake wheel 5.

The brake shoe 2 and the shaft 14 are connected to each other via a guide element 11, which consists of a spigot or rod 12 at the lower end of the shaft 14 and a hole 13 in the brake shoe 2. Thus, as the spigot or rod at the end of the shaft is in the hole 13 in the brake shoe and the shaft 14 is rigidly mounted and is only vertically slidable in the brake body 1, the guide element 11 keeps the brake shoe tightly in position, preventing it from swinging and turning and only allowing precise braking movements in the braking direction. In other words, the shaft 14 receives a brake torque from the brake shoe 2 via the spigot or rod 12 and a support moment from the brake body 1 via the sliding bearings 31, 32, so that the brake shoe cannot substantially move sideways because the tolerances in the sliding bearings 31, 32 and in the guide element can be small and deflections in the structure are very small. Of course, the curved shape of the brake shoe also guides and stabilises its movement so that no large lateral supports are needed in the structure. However, it is the shaft 14, the spigot or rod 12 at its end and the hole 13 in the brake shoe that transmit the brake torque to the body of the holding brake, so it is important that these elements be sturdy and free of play. The shaft 14, the spigot or rod 12 and the collar in the shaft, comprising an upper shoulder 15 and a lower shoulder 16, preferably form a single continuous body. The sliding bearings 31, 32 between the brake body 1 and the shaft 14 are so disposed that the upper sliding bearing 31 lies between the shaft 14 and a screw part 33 engaging an internal thread in the brake body. The screw part 33 can be used to adjust the pressure of the disk spring set forming the pressure element 6 and at the same time the force with which the brake shoe 2 is pressed against the brake wheel.

The holding brake presented in FIG. 1 additionally comprises a forced release function, which allows the brake to be released during a power failure. This is implemented by providing the upper end of the shaft 14 with an oil space 18, with an oil nipple 19 leading into the oil space. Thus, by supplying oil through the nipple 19 into the oil space 18, a hydraulic pressure is generated which lifts the shaft 14 and with it the brake shoe 2. The oil space can be vented via a bleed screw 30.

FIG. 2 presents another embodiment of the adjusting elements 8 as compared with FIG. 1. In the adjusting elements, a set of adjusting shims or, depending on the need, an adjusting shim 20 taken from the set is used, which is placed in the adjusting element between the brake shoe 2 and the intermediate frame 7. After this, the brake shoe and the intermediate frame are tightened against each other by means of the tightening element 21. Therefore, the adjusting shim 20 determines the position of the brake shoe and thus also the width of the air gap between the brake shoe and the brake wheel.

FIG. 3 illustrates a practical application of the holding brake of the invention, the brake being mounted on a double elevator machine with two permanent magnet motors mounted on the same shaft on opposite sides of a common large traction sheave 23. In this application, two holding brakes as illustrated in FIG. 1 are connected together by their brake frames 17, the brake bodies 1 being utilised as a means for rigidly binding and attaching the motor frames 22 to each other. Therefore, the basic idea of the invention that the adjustment of the brake pieces is carried out independently of the positions of the brake bodies 1 and brake frames 17 is essential.

In the foregoing, the invention has been described by way of example by the aid of the attached drawing, but different embodiments of the invention are possible within the scope of the inventive idea defined in the claims.

What is claimed is:

1. A holding brake for a traction sheave elevator comprising:

a brake body;

a brake shoe attached to the brake body;

a retractor for keeping the brake shoe clear of a brake wheel, an air gap being provided between the brake shoe and the brake wheel;

a mechanical pressure element for pressing the brake shoe against the brake wheel;

an intermediate frame disposed between the brake body and the brake shoe, the pressure element being arranged to apply a pressure on the intermediate frame; and adjusting elements between the intermediate frame and the brake shoe to allow adjustment of a position of the brake shoe in relation to the intermediate frame when the air gap is between the brake shoe and the brake wheel is being adjusted.

2. The holding brake as defined in claim 1, wherein the fpadjusting elements adjust positioning of the intermediate frame and the brake shoe only when the air gap between the brake shoe and the brake wheel is to be adjusted.

3. The holding brake as defined in claim 1, wherein positioning of the brake body is fixed and stationary when the adjusting elements adjust the brake shoe.

4. The holding brake as defined in claim 1, wherein the brake shoe has a curved braking surface elongated in a direction of motion of the brake wheel.

5. The holding brake as defined in claim 4, wherein in a lengthways direction of the brake shoe, the adjusting elements are disposed on different sides of a center of the brake shoe.

6. The holding brake as defined in claim 5, wherein the adjusting elements are disposed near ends of the brake shoe.

7. The holding brake as defined in claim 1, wherein at least one of the adjusting elements comprises an adjusting spring and a clamping element, the adjusting spring urges the brake shoe away from the intermediate frame and the clamping element pulls the brake shoe toward the intermediate frame against a pressure of the adjusting spring.

8. The holding brake as defined in claim 1, wherein at least one of the adjusting elements comprises a set of adjusting shims and a tightening device arranged to tighten the brake shoe in relation to the intermediate frame into a position determined by a set of the adjusting shims.

9. The holding brake as defined in claim 1, wherein the brake body and the brake shoe are connected together via a guide element to prevent the brake shoe from turning in relation to the brake body.

10. The holding brake as defined in claim 9, wherein the guide element comprises a rod extending outwardly from the brake body and a hole in the brake shoe for receiving the rod.

11. The holding brake as defined in claim 1, wherein the retractor is an electromagnet.

12. The holding brake as defined in claim 11, wherein the electromagnet is a circular ring and wherein the brake body and the brake shoe are connected together via a guide element, the guide element being disposed substantially successively on a center axis of the electromagnet.

13. The holding brake as defined in claim 12, wherein the guide element prevents the brake shoe from turning in relation to the brake body.

* * * * *